United States Patent [19]
Jasinski et al.

[11] 4,209,285
[45] Jun. 24, 1980

[54] UNITARY PUMP PACKING

[75] Inventors: Dennis N. Jasinski, Naperville; Jerry Shifman, Galesburg; Selwyn Mather, Elmhurst, all of Ill.

[73] Assignee: The Richardson Company, Des Plaines, Ill.

[21] Appl. No.: 849,757

[22] Filed: Nov. 9, 1977

[51] Int. Cl.² .................. F01B 31/00; F04B 19/22; F16J 9/08
[52] U.S. Cl. .......................... 417/571; 92/173; 92/240
[58] Field of Search .................... 92/240, 245, 173; 277/212 C, 173; 417/569, 571

[56] References Cited

U.S. PATENT DOCUMENTS

| | | | |
|---|---|---|---|
| 1,786,231 | 12/1930 | Dick | 92/245 |
| 1,868,935 | 7/1932 | Breneman | 92/245 X |
| 2,003,769 | 6/1935 | Christenson | 92/245 |
| 2,140,778 | 12/1938 | White | 92/245 X |
| 2,840,428 | 6/1958 | Browall | 92/245 X |
| 3,103,787 | 9/1963 | Reynolds | 92/245 X |
| 3,108,514 | 10/1963 | Gordon | 277/212 C |
| 3,806,134 | 4/1974 | Schexnayder | 277/212 |
| 3,940,938 | 3/1976 | Durham et al. | 92/245 X |

Primary Examiner—Irwin C. Cohen
Attorney, Agent, or Firm—Lockwood, Dewey, Alex & Cummings

[57] ABSTRACT

A unitary packing especially suitable for use in pumps which transport liquids such as water-based solutions or suspensions includes a generally concave working face having an outer cylindrical annular flange, a generally convex opposed face preshaped for complementary overlying engagement with the working side of a pump piston. The packing, during use, is characterized by substantially reduced stresses and an extended life when compared with conventional packings. The packing may also be structured for occasional axial rotation with respect to the cylinder wall of the pump, which rotation may be enhanced by providing a force-directing element on the concave working face of the packing, this occasional rotation serving to circumferentially reorient the outer cylindrical annular flange of the packing with respect to the inner wall of the pump cylinder to thereby uniformly distribute wear caused by imperfections such as occlusions in the cylinder lining.

11 Claims, 8 Drawing Figures

U.S. Patent Jun. 24, 1980 4,209,285
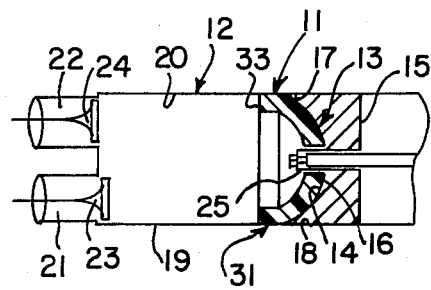
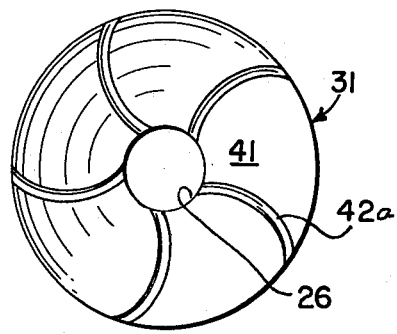
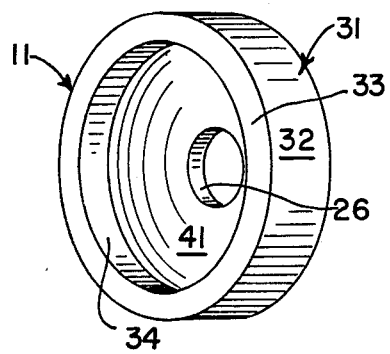
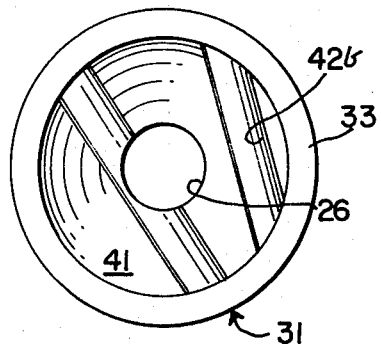
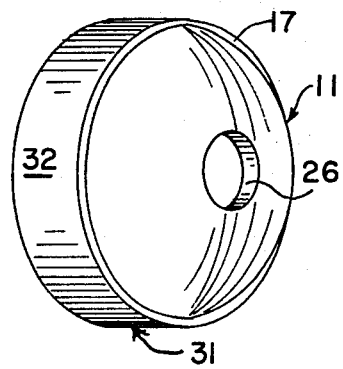
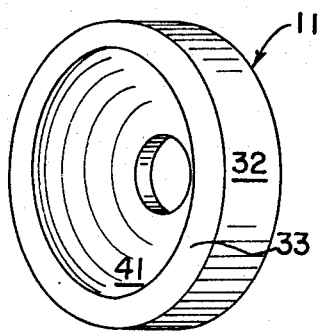
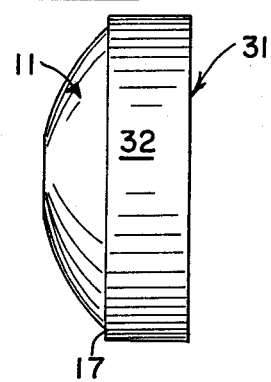
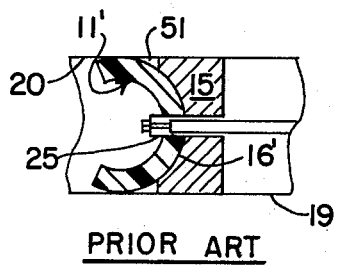

UNITARY PUMP PACKING

BACKGROUND AND DESCRIPTION OF THE INVENTION

The present invention generally relates to packings for pumps and, more particularly, to improved packings which are especially adapted for sealing the working side of the reciprocating piston in a pump for liquids such as water-based solutions or suspensions. In this regard, an important embodiment of the present invention is directed to an improved unitary packing wherein a generally concave or cup-shaped packing member includes an outer cylindrical annular flange and is otherwise structured, including a radially extending annular lip, to complementarily overlie the working side surface of the piston of a positive displacement chemical feed pump, the generally concave working surface of the packing being the liquid-contacting surface when the pump is in use.

Packings in combination with the working side of a piston within a reciprocating, liquid transporting pump have heretofore been employed in a wide variety of applications. In general, it has been found advantageous to provide these packings in a generally concave or cup-shaped form and to install them over a generally concave working side of a reciprocating piston to enhance the seal provided between the annular extent of the piston and the wall or lining of the pump cylinder within which it is fitted, such packings being made of somewhat elastomeric material in order to enhance the seal between the piston and the cylinder lining. Such packings, when originally formed and initially installed, are usually not in close overlying relationship with substantially the entire generally concave working side surface of the piston, primarily because the non-working, convex surface of such known packing assemblies are substantially hemispherical throughout while the concave working side surface of the piston has a generally hemispherical configuration which is terminated at its annular extent by a radially extending circumferential lip, whereby the substantially entirely hemispherical surface of the packing assembly does not closely overlie the generally concave surface of the piston substantially throughout the entire extent thereof. Consequently, after a pump incorporating such a packing assembly is in use for several hours, the packing will begin to deform, primarily by cold flowing, into the free space that existed between the initially structured hemispherical surface of the packing assembly and the generally concave surface of the piston. Experience with such arrangements has indicated that this free space left upon initial installation permits the heretofore mentioned cold flow as well as an attendant interference between the packing assembly and the cylinder lining and a detrimental stress on the structure, resulting in a distortion of the sealing surface of the packing assembly and a failure of the assembly to provide the sealing function between the piston and the cylinder for which it is intended.

In accordance with the present invention, the foregoing problems and disadvantages of these reciprocating pump packing assemblies have been overcome through the use of packing assemblies that include an axially extending outer annular flange throughout the annular extent thereof such that a radially extending circumferential lip is formed where the generally convex surface joins the annular flange, whereby the packing assembly closely overlies the working side surface of the piston. As such, any free space between the mating surfaces of the piston and the packing assembly is substantially eliminated so that stresses and interferences between the cylinder lining and the annular extent of the packing are significantly reduced from those found in hemispherically shaped packing assemblies in order to greatly extend the working life of the packing assembly. Furthermore, the working life of the packing may be extended even further by structuring the packing to have the ability to intermittently rotate somewhat about its axis in order to significantly reduce wear along the outer surface of its planar annular flange which would otherwise be caused by an invariable orientation of the packing with respect to the cylinder lining, thereby permitting any imperfections such as occulusions or burrs on the cylinder lining to score or otherwise damage the annular flange of the packing assembly upon several hours of reciprocating movement.

It is, therefore, an object of the present invention to provide an improved packing.

Another object of the present invention is an improved packing which is especially suitable for use in piston and cylinder pumps for liquids, particularly hot aqueous liquids.

Another object of this invention is to provide an improved piston packing which includes an outer cylindrical annular flange structured for sealing communication with the cylinder lining of a pump.

Another object of the present invention is an improved unitary packing member having a generally convex surface that is structured to closely overlie the generally concave surface of a reciprocating piston in a pump to reduce stresses in and to extend the working life of the packing member.

Another object of this invention is an improved unitary packing member that is rotatable about its axis to minimize scoring thereof by imperfections in the piston wall which can lead to failure of the packing assembly.

Further objects and advantages of this invention will become more clearly apparent from the following description and accompanying drawings in which like reference numerals indicate corresponding parts throughout the several figures and wherein:

FIG. 1 is a side sectional view of the preferred packing, mounted within a typical reciprocating pump;

FIG. 2 is a working side or front perspective view of the preferred packing;

FIG. 3 is a rear perspective view of the packing shown in FIG. 2;

FIG. 4 is a side elevation view of the preferred packing of FIG. 2;

FIG. 5 is a front perspective view of an alternate embodiment of the packing in accordance with this invention;

FIGS. 6 and 7 are front elevational views of other alternate embodiments of the packing, depicting force directing elements on the working surface; and FIG. 8 is a sectional view of a prior art packing installed within a reciprocating pump.

While packings in accordance with this invention may be used in different environments, the invention as described herein in detail is particularly well adapted for use as a unitary packing member within a reciprocating piston and cylinder pump wherein the piston has a generally concave working surface such as those pumps that are used in transporting liquids, particularly aqueous liquids at room temperature or at an elevated temperature. This invention has been found to be especially suitable for use in pumps that transport agricultural slurries.

Referring to the drawings in greater detail, FIG. 1 depicts a cross-section through the preferred unitary packing member, generally referred to by reference numeral 11, when installed within a reciprocating pump, generally referred to by reference numeral 12. Packing member 11, particularly its generally convex face, generally designated by reference numeral 13, which is opposed to the working face thereof, is structured for closely overlying relationship with the generally concave working side surface 14 of the pump piston 15. Such opposed face 13 of packing member 11 includes a substantially hemispherically shaped convex surface 16 and a radially extending circumferential lip 17 located at the annular extent of generally hemispherical surface 16 and structured for a closely overlying relationship with respect to that portion of the working-side surface 14 of piston 15 that is not generally hemispherical and that most often takes the form of a radially extending circumferential lip 18 on the piston 15.

Piston 15 itself is mounted for reciprocating movement within a cylinder 19 of the pump 12, cylinder 19 including a lining 20. Generally, the reciprocating pump 12 will include an intake port 21 and an exhaust port 22 which are openable and closeable usually by valve means such as intake valve 23 and exhaust valve 24, respectively, whereby intake valve 23 is open and exhaust valve 24 is closed while piston 15 moves from its maximum compression position through to its maximum non-compression position (FIG. 1) and also whereby exhaust valve 24 is open and intake valve 23 is closed while piston 15 moves from its maximum non-compression position through to its maximum compression position. Piston 15 will also usually include a piston shaft extension member 25 over which packing member 11 may be fitted by means of its central bore 26.

As can perhaps be best seen in FIGS. 2, 3, and 4, the packing member 11 has an axially extending outer annular flange, generally referred to by reference numeral 31, flange 31 including said radially extending circumferential lip 17, and an axially extending outer cylindrical annular surface 32 that is structured for sliding, sealing communication along and with cylinder lining 20. Flange 31 also preferably includes a working-side radially extending circumferential lip 33, usually formed upon molding the packing member 11 and generally being a preferred element because of the increased strength imparted thereby to flange 31 as a whole. Preferably provided in connection with flange 31 is an axially extending inner cylindrical annular surface 34. By this structure, flange 31, especially by the provision of its circumferential lip 17, can be placed into very closely overlying mating contact with the generally concave working-side surface 14 of piston 15 because of its ability to closely accommodate the lip 18 of piston 15.

FIGS. 5, 6, and 7 depict alternate embodiments of the packing member 11. The embodiment shown in FIG. 5 is one in which the inner annular surface 34 (FIGS. 1 and 2) is omitted, with the interior hemispherical surface 41 extending throughout the full inner surface of this embodiment, whereas in FIG. 6, the generally hemispherical inner surface 41 extends even further such that the radially extending lip 33 is substantially eliminated.

Further depicted in FIGS. 6 and 7 are alternate embodiments wherein the generally hemispherical surface 41 includes a force-directing element 42a or 42b, for imparting a circumferentially directed force to packing member 11 thereby urging it toward rotational movement with respect to the cylinder 19 when the pump 12 is in operation, the circumferentially directed force being developed from forces applied by the fluid being pumped upon the working side of packing member 11. Such force-directing element 42a or 42b may be either in the nature of raised flutes or cut-out grooves, the element 42a being depicted in FIG. 6 as a raised flute, and the element 42b being depicted in FIG. 7 as a cut-out groove; additionally, they may be generally curved as are elements 42a or they may be generally straight as illustrated by elements 42b.

Whether or not element 42a or 42b is provided, a certain amount of rotation of the packing member 11 may be accomplished when installed within a reciprocating pump 12 by having a small amount of play present between the central bore 26 and the piston shaft extension 25, usually accomplished by providing bore 26 in an oversized condition with respect to the outside diameter of the shaft extension 25. Element 42a or 42b, when provided, is supplied in order to assist this rotational movement which is responsive to the forces exerted upon piston 15 in general, and upon packing member 11 in particular, at the time that the piston 15 reverses its reciprocating direction. Reciprocating direction reversal occurs from the time just before piston 15 reaches its maximum non-compressed state until just after it passes through its maximum non-compressed state, at which time there is usually a dynamic surge of fluids within the pump cylinder 19 toward the piston 15, which surge at this particular orientation of the piston 15 will be transmitted to packing member 11 to impart a limited rotational movement thereof. This rotational movement is brought about more consistently when such dynamic surges develop forces onto optional element 42a or 42b to thereby impart an increased circumferentially directed force on the packing member 11 and cause such desired limited rotation. By whatever means this limited rotation is brought about, it serves to extend the working life of the packing member 11 to more uniformly distribute frictional forces by preventing extensive repetitive sliding of any particular location along outer annular surface 32 with respect to a particular location on the cylinder lining 20 having an imperfection such as a burr, an occlusion, and the like, which repetitive sliding would, over time, serve to wear an undesired score mark into the surface 32 and eventually cause failure of packing member 11 by permitting liquid to pass between surface 32 and cylinder lining 20.

In the prior art structure depicted in FIG. 8, a packing member 11' is shown in its shape as initially installed, the assembly having no lip member corresponding to the radially extending circumferential lip 17 of packing member 11 in accordance with this invention. As a consequence, there is a certain amount of free space 51 located between the completely generally spherical convex surface 16' of the packing assembly 11', leading to the undesirable stresses and interferences described elsewhere herein which usually results in the deformation of packing member 11' to bring about the failure thereof.

Unitary packing member 11 is most advantageously made of a material that has some elastomeric properties, that has a relatively low coefficient of friction, and that will be resistant to deformation when used in the presence of hot liquids. Preferably, packing member 11 will have a consistency between about 70 shore A hardness to about 80 shore D hardness. Found especially suitable are nitrile rubber compositions which have a carbon black loading and a phenolic resin reinforcing agent. As an optional component of these compositions, there may also be included therein a finely divided metal powder, such as a bronze or aluminum powder, which serves to further extend the life of the packing by improving the heat conduction properties thereof to assist in dissipating heat developed during use.

Exemplifying these nitrile rubber compositions are the so-called medium to high acrylonitrile rubbers such as butadiene/acrylonitrile copolymers having an acrylonitrile content at the medium level or at the high level, which is generally between about 28 and 50 weight percent of the copolymer. The medium level acrylonitrile contents, preferably between about 30 and 35 weight percent, offer advantageous resiliency, while the high level acrylonitrile contents, usually above 38 weight percent, contribute increased abrasion resistance. The preferred rubber is a butadiene/acrylonitrile copolymer known under the trade designation Hycar 1042 (B. F. Goodrich Chemical Company) which has an acrylonitrile content of about 33 weight percent, is low temperature polymerized, has a specific gravity of 0.98, and has an average Mooney viscosity of 80. The rubber composition provides soft or elastomeric properties to the material used in forming the packing member 11.

When the material that is used to form the packing member 11 includes a phenolic resin reinforcing agent, it is included to increase the hardness of the material. Found to be particularly useful is a phenolic resin known by the trade designation Durez 12687 (Hooker Chemical Corporation), which is a finely pulverized, thermosetting phenolic resin of the two-step type, exhibits a medium cure (23 seconds at 165° C.), a 60° C. contraction point, a long flow (75 mm), a rigid set, screen tests at 1% on 200 mesh, maximum, and a cured specific gravity of 1.18. These exemplified rubber compositions, loading agent, and reinforcing agent are only representative of the types of formulations that provide the properties suitable for use in this invention.

EXAMPLE 1

In an example comparing the useful working life of a packing member of the prior art such as that shown in FIG. 8 with a packing member in accordance with the present invention as shown in FIGS. 1-4, both packing members were installed within reciprocating pumps and put to use by pumping hot water at 190° F. under 1,000 lbs. per square inch of pressure and at a flow of approximately 25 gallons per minute. The prior art packing failed after about 100 hours of service, it having worn out to such a degree that substantial leakage between the piston and cylinder of the pump was observed. Under the same conditions, the packing in accordance with this invention was still in service after 1,400 hours of pumping without any packing failure being evident. Both the prior art packing member and the packing member in accordance with this invention were molded of the same material, the material being Hycar 1042 with a carbon black loading and a Durez 12687 phenolic resin reinforcing agent.

EXAMPLE 2

Another comparative test between a prior art packing member and a packing member in accordance with this invention was performed, this time the assembly in accordance with this invention being rotatable on the piston shaft extension of a pump piston. A commercial agricultural slurry was passed through both pumps. Failure of the packing member of the prior art is evident after approximately 400-500 hours of service. The packing member in accordance with the present invention was removed and inspected after over 1,000 hours of operation, at which time no evidence of wear and no significant scores in the outer surface of the annular planar flange were noted.

EXAMPLE 3

A non-rotatable packing was molded of a composition which included finely divided metal powder, the composition including Hycar 1042 having a carbon black loading, a Durez 12687 phenolic resin reinforcing agent, and finely divided bronze powder. After testing this packing within a commercial positive displacement pump for an excess of 1,000 operating hours, the packing was found to have substantially maintained its initial configuration and showed no evidence of significant failure, despite the temperatures to which it had been exposed during use.

Modifications or variations of the described embodiments of this invention will be apparent to those skilled in the art, and it is thus contemplated that such changes may be made without departing from the spirit of the invention or the scope of the appended claims.

We claim:

1. In an improved packing in combination with a positive displacement reciprocating liquid chemical feed pump having a cylinder and a piston reciprocably mounted therein, said cylinder having associated therewith an inlet port controlled by an inlet valve and an outlet port controlled by an exhaust valve, the piston having a unitary packing member mounted on a generally concave working side thereof, said packing member having a generally concave working face for operative contact with a liquid to be pumped, a generally convex opposed surface, a working-side radially extending circumferential lip, an axis, and a centrally disposed bore for mounting said packing member over an extension member of said piston, said extension member having a predetermined outside diameter, the improvement compising said generally convex opposed surface of the unitary packing member being preshaped for complementary overlying relationship with the working-side surface of said piston, the unitary packing member including an axially extending outer cylindrical annular flange, said annular flange including a radially extending circumferential lip on said generally convex opposed surface of the packing member, said lip closely overlying a radially extending circumferential lip on said generally concave working side of the reciprocating pump piston, said generally concave working face of the packing member extending from said bore to said annular flange, said centrally disposed bore of the packing member being oversized with respect to said predetermined outside diameter of the extension member, and said packing member being rotatable on said extension member about said axis of the packing member.

2. The improved combination of claim 1, wherein said flange includes an axially extending inner cylindrical annular surface, an axially extending outer cylindrical annular surface, and a working-side radially extending circumferential lip in communication with the respective working-side circumferences of said axially extending inner cylindrical annular surface and said axially extending outer cylindrical annular surface.

3. The improved combination of claim 1, wherein said flange includes an axially extending outer cylindrical annular surface and a working-side radially extending circumferential lip, said working-side lip communicating the generally concave working face of said preshaped packing member with the working-side circumference of said outer annular surface.

4. The improved combination of claim 1, wherein said generally concave working face of the packing member has a force-directing element thereon for promoting rotation of the packing member.

5. The improved combination of claim 1, wherein said generally concave working face of the packing member has a force-directing element, said element being a raised flute.

6. The improved combination of claim 1, wherein said generally concave working face of the packing member has a force-directing element, said element being a cut-out groove.

7. The improved combination of claim 1, wherein said packing member is constructed of a homogeneous rubber composition having a consistency between about 70 Shore A hardness to about 80 Shore D hardness, said rubber composition being chemically resistant to pumped fluids, having a low coefficient of friction, and being resistant to heat deformation.

8. The improved combination of claim 1, wherein said packing member is constructed of nitrile rubber having a carbon black loading and a phenolic resin reinforcing agent.

9. The improved combination of claim 1, wherein said packing member is constructed of nitrile rubber having a carbon black loading, a phenolic resin reinforcing agent, and a finely divided metal powder component.

10. The improved combination of claim 1, wherein said flange includes an axially extending outer cylindrical annular surface for sliding and sealing engagement with an internal lining of said cylinder.

11. The improved combination of claim 1, wherein said unitary preshaped packing member is constructed of nitrile rubber having a carbon black loading and a phenolic resin reinforcing agent, said packing member having a consistency between about 70 Shore A hardness to about 80 Shore D hardness, said rubber composition being chemically resistant to pumped fluids, having a low coefficient of friction, and being resistant to heat deformation.

* * * * *